United States Patent [19]

Taplin

[11] Patent Number: 4,952,916

[45] Date of Patent: Aug. 28, 1990

[54] POWER TRANSMISSION

[75] Inventor: Lael B. Taplin, Union Lake, Mich.

[73] Assignee: Vickers, Incorporated, Troy, Mich.

[21] Appl. No.: 445,354

[22] Filed: Dec. 4, 1989

[51] Int. Cl.[5] ...................... G08B 21/00; G01N 22/00

[52] U.S. Cl. .................................... 340/686; 324/633; 324/635; 324/642; 333/34; 333/24 C; 333/115; 91/361; 92/5 R

[58] Field of Search ........................... 340/686, 310 R; 324/633–637, 658; 333/32, 34, 24 C, 115; 331/74, 109 C; 91/358 R, 1, 361; 92/5 R

[56] References Cited

U.S. PATENT DOCUMENTS

| | | | |
|---|---|---|---|
| 3,390,356 | 6/1968 | Ryals et al. | 333/115 |
| 4,588,953 | 5/1986 | Krage | 91/189 R |
| 4,737,705 | 4/1988 | Bitai et al. | 324/633 |
| 4,749,936 | 6/1988 | Taplin | 333/17.1 |
| 4,757,745 | 7/1988 | Taplin | 91/361 |

*Primary Examiner*—Donnie L. Crosland
*Attorney, Agent, or Firm*—Barnes, Kisselle, Raisch, Choate, Whittemore & Hulbert

[57] ABSTRACT

An electrohydraulic control system includes an actuator having a cylinder and a piston variably positionable therewithin. An electrohydraulic valve is responsive to valve control signals for coupling the actuator to a source of hydraulic fluid. A coaxial transmission line extends through the actuator, and includes an outer conductor formed by the actuator cylinder and a center conductor operatively coupled to the piston such that length of the coaxial transmission line is effectively directly determined by position of the piston within the cylinder. An rf generator is coupled by an antenna to the coaxial transmission line for launching rf energy therewithin, and valve control electronics is responsive to rf energy reflected by the coaxial transmission line for indicating position of the piston within the cylinder and generating electronic control signals to the valve. The antenna includes a pad positioned radially adjacent to but spaced from the center conductor of the transmission line, an rf connector axially spaced from the pad, and an exponentially tapering transmission line that extends axially and radially from the pad to the connector. The dimensions of the tapering transmission line are tailored to match characteristic impedance of the coaxial transmission line to that of the electronics at the rf connector.

21 Claims, 3 Drawing Sheets

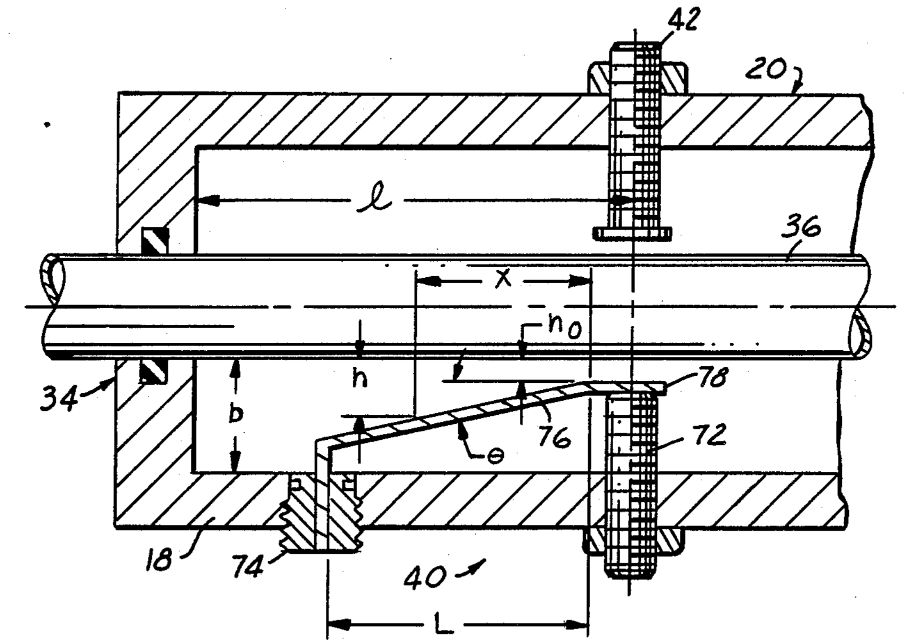
FIG. 2
FIG. 3
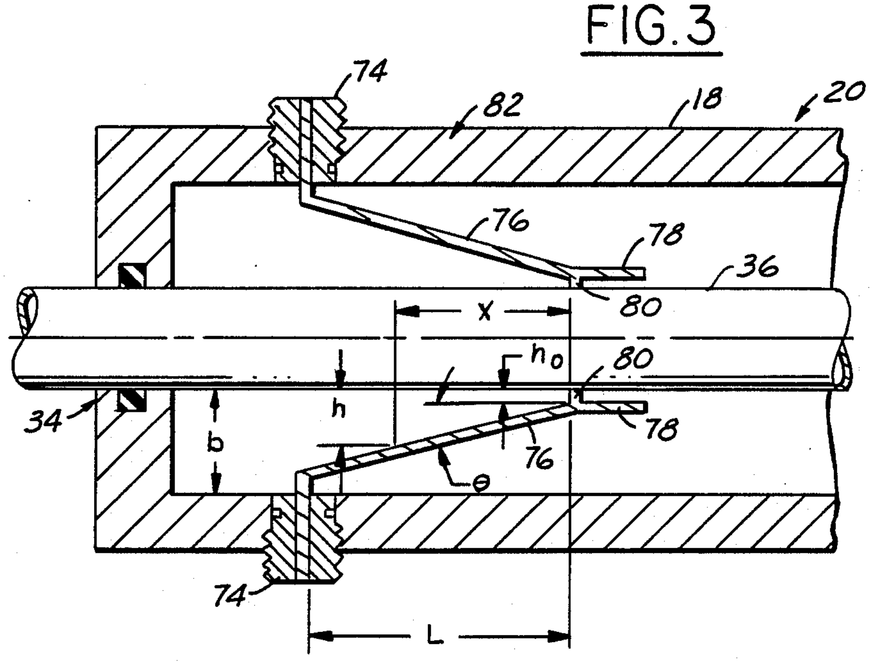

POWER TRANSMISSION

The present invention is directed to position measuring devices, and more particularly to apparatus for determining position of an actuator piston in an electrohydraulic valve and actuator system.

BACKGROUND AND OBJECTS OF THE INVENTION

In electrohydraulic valve control systems that embody a valve coupled to a hydraulic actuator, it is desirable to monitor position of the actuator piston for purposes of closed-loop servo control. U.S. Pat. No. 4,749,936 discloses an electrohydraulic valve control system in which a coaxial transmission line is formed within the actuator to include a center conductor coaxial with the actuator and an outer conductor. A bead of ferrite or other suitable magnetically permeable material is magnetically coupled to the piston and surrounds the center conductor of the transmission line for altering impedance characteristics of the transmission line as a function of position of the piston with the cylinder. Position sensing electronics includes an oscillator coupled to the transmission line for launching electromagnetic radiation, and a phase detector responsive to radiation reflected from the transmission line for determining position of the piston within the actuator cylinder. In a preferred embodiment, the coaxial transmission line includes a tube, with a centrally-suspended center conductor and a slidable bead of magnetically permeable material, projecting from one end of the actuator cylinder into a central bore extending into the opposing piston. In another embodiment, the outer conductor of the transmission line is formed by the actuator cylinder, and the center conductor extends into the piston bore in sliding contact therewith as the piston moves axially of the cylinder.

U.S. Pat. No. 4,757,745 discloses an electrohydraulic valve control system that includes a variable frequency rf generator coupled through associated directional couplers to a pair of antennas that are positioned within the actuator cylinder. The antennas are physically spaced from each other in the direction of piston motion by an odd multiple of quarter-wavelengths at a nominal generator output frequency. A phase detector receives the reflected signal outputs from the directional couplers, and provides an output through an integrator to the frequency control input of the generator automatically to compensate frequency of the rf energy radiated to the cylinder, and thereby maintain electrical quarter-wavelength spacing between the antennas, against variations in dielectric properties of the hydraulic fluid due to changes in fluid temperature, etc. A second phase detector is coupled to the generator and to one antenna for generating a piston position signal. The output of the second phase detector is responsive to phase angle of energy reflected from the piston and provides a direct real-time indication of piston position to the valve control electronics.

Although the systems disclosed in the above-noted U.S. patents provide improved economy and performance as compared with previous devices for a similar purpose, improvements remain desirable. In particular, difficulties have been encountered in attempting to match the characteristic impedance of the cylinder/piston coaxial transmission line, determined by parameters and properties of the cylinder, with that of the rf generator circuitry. Specifically, it has been found that characteristic impedance of the cylinder/piston coaxial transmission line can vary widely among actuators, and does not match the standard fifty ohm characteristic impedance used throughout the microwave industry.

A general object of the present invention, therefore, is to provide apparatus for determining position of a piston within an electrohydraulic actuator that is inexpensive to implement, that is adapted to monitor motion continuously in real-time, that is accurate to a fine degree of resolution, and that is reliable over a substantial operating lifetime. Another object of the invention is to provide apparatus of a described character that automatically and closely matches the characteristic impedance of the generator circuitry to that of the piston/-cylinder transmission line.

A further object of the invention is to provide a coaxial transmission system that embodies enhanced capability for matching impedance of the transmission line to impedance of the associate generator circuitry.

Yet another object of the invention is to provide a system of general utility for monitoring position of a piston within a cylinder, and having particularly application for monitoring piston position in an electrohydraulic servo valve and actuator system of the character described.

SUMMARY OF THE INVENTION

An electrohydraulic control system in accordance with the invention includes an actuator, such as a linear or rotary actuator, having a cylinder and a piston variably positionable therewithin. An electrohydraulic valve is responsive to valve control signals for coupling the actuator to a source of hydraulic fluid. A coaxial transmission line extends into the actuator, and includes an outer conductor formed by the actuator cylinder and a center conductor operatively coupled to the piston, such that length of the coaxial transmission line is effectively directly determined by position of the piston within the cylinder. An rf generator is coupled to the coaxial transmission line for launching rf energy therewithin, and valve control electronics is responsive to rf energy reflected by the coaxial transmission line for indicating position of the piston within the cylinder and generating electronic control signals to the valve.

Apparatus for monitoring position of a piston within a cylinder in accordance with the invention comprises a coaxial transmission line in which the outer conductor is formed by the cylinder and the center conductor is operatively coupled to the piston so that length of the coaxial transmission line is determined directly by position of the piston within the cylinder. Rf energy is capacitively coupled to the center conductor of the coaxial transmission line by an antenna that extends radially into the cylinder. The antenna in accordance with the invention includes a tapering transmission line that extends axially and radially from a pad positioned adjacent to the center conductor to an rf connector on the cylinder. Dimensions of the tapering transmission line vary, preferably exponentially, with distance between the connector and the pad so as to match characteristic impedance of the coaxial transmission line with that of the external generator and monitoring circuitry at the connector. In the preferred embodiments of the invention, the pad and tapering transmission line are formed of integral one-piece strip stock.

BRIEF DESCRIPTION OF THE DRAWINGS

The invention, together with additional objects, features and advantages thereof, will be best understood from the following description, the appended claims and the accompanying drawings in which:

FIG. 2 is a fragmentary view of a portion of FIG. 1 on an enlarged scale;

FIG. 3 is a view similar to that of FIG. 2 illustrating a modified embodiment of the invention.

DETAILED DESCRIPTION OF PREFERRED EMBODIMENTS

Figure 1:
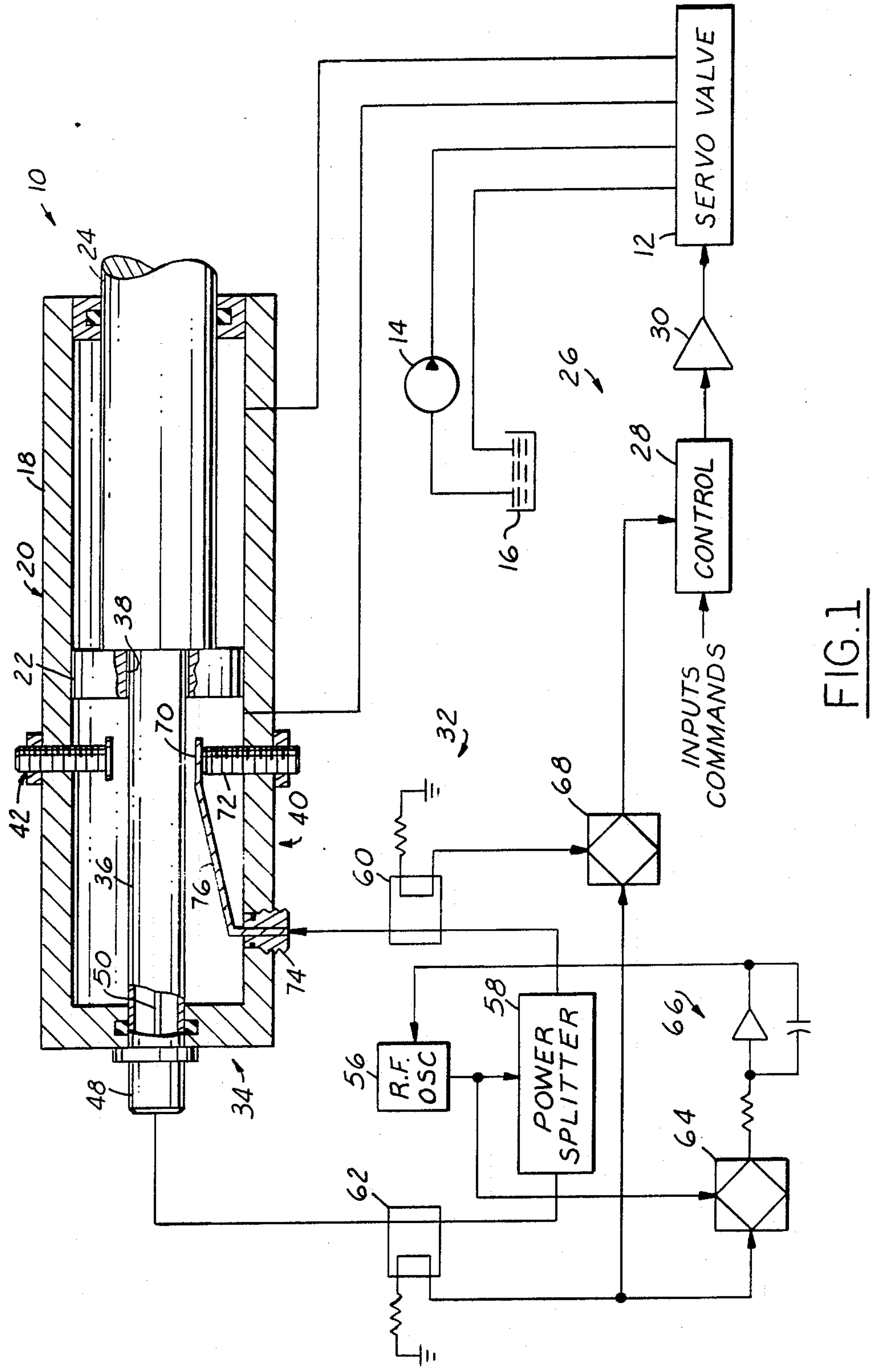
FIG. 1 is a schematic diagram of an electrohydraulic valve and actuator control system that features piston position monitoring circuitry in accordance with a presently preferred embodiment of the invention.

FIG. 1 illustrates an electrohydraulic control system 10 as comprising an electrohydraulic servo valve 12 having a first set of inlet and outlet ports connected through a pump 14 to a source 16 of hydraulic fluid, and a second set of ports connected to the cylinder 18 of a linear actuator 20 on opposed sides of the actuator piston 22. Piston 22 is connected to a rod 24 that extends through one axial end wall of cylinder 18 for connection to an actuator load (not shown). Servo electronics 26 includes control electronics 28, preferably microprocessor-based, that receives input commands from a master controller or the like (not shown) and provides a pulse width modulated drive signal through an amplifier 30 to servo valve 12. Piston monitoring apparatus 32 in accordance with the present invention is responsive to actuator piston 22 for generating a position feedback signal to control electronics 28. Thus, for example, in a closed-loop position control mode of operation, control electronics 28 may provide valve drive signals to amplifier 30 as a function of a difference between the input command signals from a remote master controller and the position feedback signals from position monitoring apparatus 32.

In accordance with a presently preferred embodiment of the invention illustrated in FIG. 1, a first coaxial transmission line 34 is formed by a hollow cylindrical tube 36 that is affixed at one end to the end wall of cylinder 18 remote from piston rod 24. Tube 36 is slidably received at the opposing end within a central bore 38 extending axially into piston 22 and rod 24. The outer conductor of coaxial transmission line 34 is formed by the wall of cylinder 18 itself, and is electrically connected to the free end of tube 36 by means of capacative coupling between tube 36 and the piston bore, and between piston 22 and the inner surface of cylinder 18. An antenna 40 is mounted to cylinder 18 adjacent to the fixed end of tube 36, and extends radially inwardly therefrom to terminate at a fixed position adjacent to but radially spaced from the outer surface of tube 36. A screw-type stub tuner 42 is carried by cylinder 18 and adjustably extends radially inwardly therefrom diametrically opposite to antenna 40.

A second coaxial transmission line 48 is formed by a center conductor rod 50 that extends through tube 36 and is affixed thereto within piston bore 38. Tube 36 thus serves as the outer conductor of coaxial transmission line 48, as well as the inner conductor of coaxial transmission line 34. Coaxial transmission line 48 is of fixed dimension axially of cylinder 18 and includes a plurality of apertures for admitting hydraulic fluid into the hollow interior of tube 36. The apertures are small as compared with operating frequency. Thus, whereas the electrical properties of coaxial transmission line 34 vary both as a function of position of piston 32 within cylinder 18 and dielectric properties of the hydraulic fluid, the electrical properties of coaxial transmission line 48 vary solely as a function of fluid properties since the transmission line length is fixed.

An rf oscillator 56 generates energy at radio frequency as a function of signals at an oscillator frequency control input. The output of oscillator 56 is fed to a power splitter 58, which in turn feeds the oscillator output through a pair of directional couplers 60, 62 to antenna 40 and the center conductor of coaxial transmission line 48. The rf energy at antenna 40 is capacitively coupled to tube 36, and thus launched in coaxial transmission line 34. Stub tuner 42 is adjusted to help match input impedance of transmission line 34 to impedance of antenna 30 and associated drive circuitry. The reflected-signal output of directional coupler 62 is connected to one input of a phase detector 64, which receives a second input from the output of oscillator 56. The output of phase detector 64 is connected through an integrator 66 to the frequency control input of oscillator 56. Thus, the output frequency of oscillator 56 is controlled as a function of phase angle of reflected energy at coaxial transmission line 48, which in turn varies solely as a function of fluid dielectric properties since the transmission line length is fixed.

The reflected-signal output of directional coupler 62 is also fed to one input of a second phase detector 68, which receives its second input from the reflected-signal output of directional coupler 60. The output of phase detector 68, which varies as a function of position of piston 22 within cylinder 18 and substantially independently of fluid dielectric properties, provides the piston-position signal to control electronics 28. To the extent thusfar described, control system 10 is similar to that disclosed in copending application Ser. No. 07/377,051 (V4138) and assigned to the assignee hereof.

In accordance with the present invention, antenna 40 (FIGS. 1 and 2) comprises a pad 70 of electrically conductive construction diametrically adjacent to and spaced from the opposing surface of tube 36 and being adjustably positioned with respect thereto by the screw 72 of nylon or other suitable insulating material. An rf connector 74 is mounted on the sidewall of cylinder 18 at a position axially spaced from screw 72 in a direction away from piston 22. A tapering transmission line 76 extends axially and radially from pad 70 to connector 74 so as to electrically connect the connector to the pad. In accordance with the distinguishing feature of the present invention, the width of transmission line 76 varies with distance between connector 74 and pad 70 so as to match the characteristic impedance of electronic circuitry at connector 74 to the characteristic impedance of coaxial transmission line 34 formed by piston 22 and cylinder 18. Preferably, pad 70 and transmission line 76 are of integral one-piece electrically conductive strip stock of uniform thickness, with the varying dimension of transmission line 76 being the width dimension tangential (or circumferential) to the axis of transmission line 34.

More specifically, and referring to FIG. 2, transmission line 76, which extends from connector 74 to pad 70 at the end of screw 72, is configured as an exponentially tapered transmission line by adjusting the width of line 76 as it leaves connector 74 and approaches pad 70. The characteristic impedance along line 76 is a function of the capacitance of the line per unit length X with respect to the diameter of tube 36 and the inside diameter of cylinder 18. Neglecting fringe effects, the capacitance per unit length in farads is given by the following equation:

$$C = .0884\epsilon\, W\left[\frac{1}{h} - \frac{1}{b-h-h_t}\right] * E^{-12} \quad (1)$$

where h is radial distance from tube 36 to line 76 as shown in FIG. 2, b is radial distance between tube 36 and cylinder 18, h is thickness of line 76, $\epsilon$ is permittivity of the dielectric fluid surrounding line 76 between cylinder 18 and tube 36, and W is width of line 76 as a function of X. All linear dimensions are in centimeters. For a tapered line:

$$Z_L = Z_{oc}e^{DX} \quad (2)$$

where $Z_{oc}$ is the characteristic impedance of transmission line 34 in ohms, $Z_L$ is the characteristic impedance of the microwave electronics at connector 74 in ohms, D is a taper constant in 1/cm, and X is axially distance along line 76 in centimeters.

For a tapered line, there is a cutoff frequency corresponding to the length L given by the equation:

$$f_c = \frac{DV}{4\pi\epsilon^{\frac{1}{2}}} \quad (3)$$

where V is the velocity of propagation in air. Combining equations 2 and 3, the length L for a given cutoff frequency is given by the equation:

$$L = \frac{\ln(Z_L/Z_{oc})}{D} = \frac{V{*}\ln(Z_L/Z_{oc})}{4f_c\pi\epsilon^{\frac{1}{2}}} \quad (4)$$

By way of example, a typical hydraulic cylinder 20 has an impedance $Z_{oc}$ of twenty-five ohms. Hydraulic oil has a dielectric constant of approximately 2.3. Velocity V is equal to 3E10cm/sec. Assuming an operating frequency of 1.5GHz and selecting $f_c$ to equal one-third of this value, length L is given by the equation:

$$L = \frac{(3E10){*}\ln\frac{(50/25)}{25.00}}{(4\pi\sqrt{2.3})\ 1.35E9/3} = 2.424 \text{ cm} \quad (5)$$

Any length L greater than 2.42cm will serve to lower the cutoff frequency $f_c$.

Continuing this example, and choosing a length L equal to 2.5cm, then from equation (4), taper constant D is given by the equation:

$$D = \frac{\ln(Z_L/Z_{oc})}{L} = 0.2773 \text{ cm}^{-1} \quad (6)$$

The characteristic impedance at any point X along line 76 is given by the equation:

$$Z_{oc} = \frac{\epsilon^{\frac{1}{2}}}{VC} \quad (7)$$

where unit capacitance C is given by equation (1). The distance h at any point X is given by:

$$h = h_o + X\tan\theta \quad (8)$$

and the angle $\theta$ is given by:

$$\tan\theta = (b - 0.20 - h_t - h_o)\,/\,L \quad (9)$$

Combining equations (1), (2) and (7) and solving for width W yields:

$$W = \frac{h\,(b-h-h_t)}{0.0884\epsilon^{\frac{1}{2}}\,V[b-h_t]Z_{oc}e^{DX}} \quad (10)$$

Figure 4:
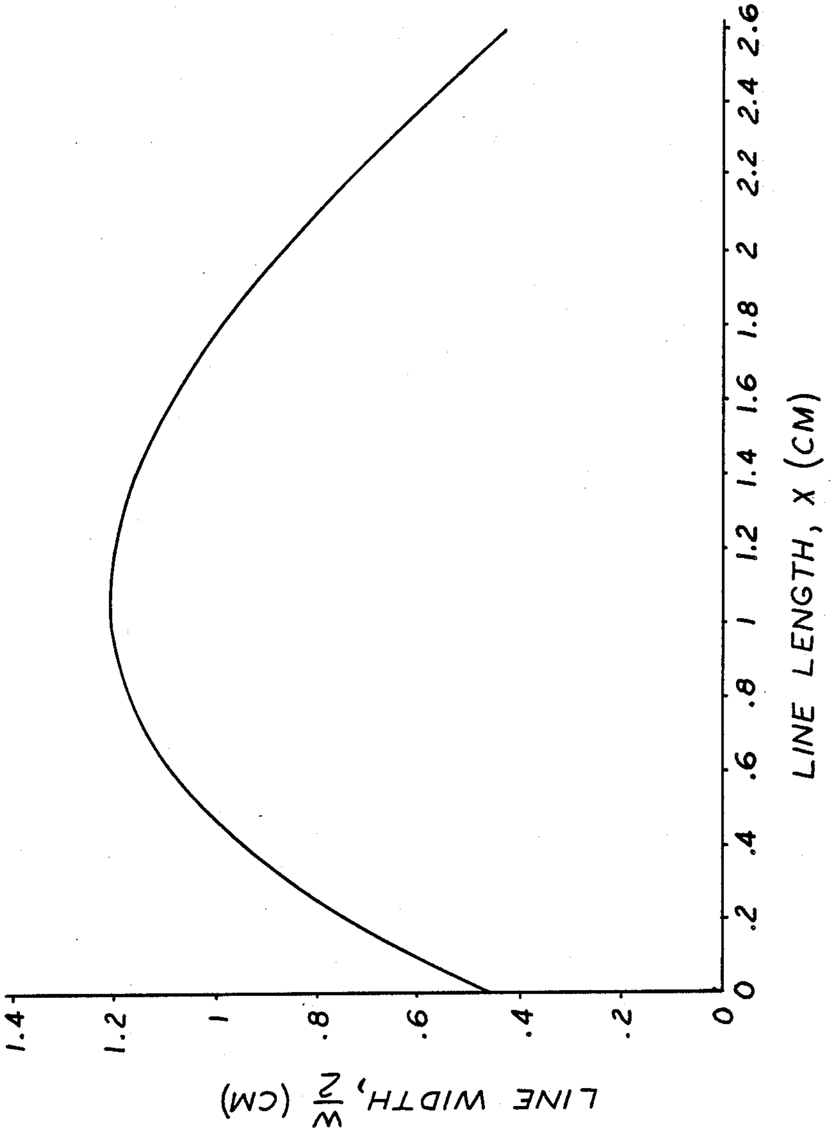
FIG. 4 is a graphic illustration useful in describing structure of the embodiment of the invention illustrated in FIGS. 1 and 2.

FIG. 4 graphically illustrates solution of equation (10) for width W in an exemplary system in which L=2.6cm; b=1.5cm; $h_t$=0.15cm; $h_o$=0.10cm; V=3E10 cm/sec.; =2.3; $Z_{oc}$=25ohms and $Z_L$=50ohms parameter. The width of the line then varies from 0.9cm at each end to 2.4cm near its center. This width is sufficiently large that line 76 should be formed on a conical mandrel having a slant angle of theta. In this way, at a given point X, the distance h remains constant with W. Tuner 42 helps offset the inductive.susceptance caused by the length 1 from the screws to the cylinder end wall. Screw 72 is adjusted to optimize the tuning and impedance match.

FIG. 3 illustrates a modified embodiment of the invention that includes two lines 76 on diametrically opposite sides of center conductor/tube 36. Each line 76 includes a finger 80 that extends radially inwardly from the juncture of line 76 and its associated pad 78 for engaging center conductor 36, fingers 80 being urged against conductor 36 by resiliency of line 76. The antenna arrangement 82 in FIG. 3 obtains more uniform wave symmetry within transmission line 34 than does antenna arrangement 40 in FIGS. 1-2, but is otherwise substantially the same as antenna arrangement 40 as hereinabove discussed.

I claim:

1. An electrohydraulic control system that includes an actuator having a cylinder and a piston variably positionable therewithin, electrohydraulic valve means responsive to valve control signals for coupling said actuator to a source of hydraulic fluid, and means responsive to position of said piston within said cylinder for generating said valve control signals, characterized in that said position-responsive means comprises:

a coaxial transmission line extending within said actuator and including an outer conductor formed by said cylinder and a center conductor operatively coupled to said piston such that length of said coaxial transmission line is determined by position of said piston within said cylinder, means for launching rf energy within said coaxial transmission line, said energy-launching means including an rf generator and antenna means extending radially into said cylinder for capacitively coupling rf energy to said center conductor, said antenna means including means forming a tapering transmission line within said cylinder coupling said generator to said antenna means while matching characteristic impedance of said generator to that of said transmission line, and means responsive to rf energy reflected by said coaxial transmission line for indicating position of said piston within said cylinder.

2. The system set forth in claim 1 wherein said line-forming means comprises a conductive strip extending laterally and angularly from a position radially adjacent to said center conductor to a wall of said cylinder, and an rf connector on said cylinder wall for connection of said conductive strip to said generator.

3. The system set forth in claim 2 wherein width of said strip tangentially of said center conductor varies as a preselected function of length of said strip axially of said center conductor.

4. The system set forth in claim 3 wherein width of said strip varies exponentially with axial length of said conductor.

5. The system set forth in claim 2 further comprising means for adjusting position of said strip radially adjacent to said center conductor.

6. The system set forth in claim 5 wherein said adjusting means comprises a screw of insulating material construction.

7. The system set forth in claim 6 wherein said energy-launching means further comprises a stub tuner extending radially into said cylinder adjacent to said antenna means for matching characteristic impedance of said coaxial transmission line to that of said energy-launching means.

8. The system set forth in claim 7 wherein said stub tuner comprises a tuning screw diametrically opposed to said antenna means across said cylinder.

9. The system set forth in claim 2 wherein said connector is positioned on a side of said antenna means remote from said piston.

10. The system set forth in claim 2 wherein said antenna means comprises identical said strips diametrically opposed to each other within said cylinder.

11. The system set forth in claim 2 wherein said antenna means further comprises a pad positioned adjacent and tangential to said center conductor, said strip and pad being of integral one-piece strip construction of uniform thickness.

12. The system set forth in claim 11 wherein said pad includes means for engaging said center conductor, and wherein said strip is constructed to urge said engaging means resiliently against said center conductor.

13. The system set forth in claim 2 wherein said rf generator has a frequency control input, and wherein said energy launching means further includes means responsive to dielectric properties of said hydraulic fluid within said cylinder for providing a control signal to said frequency control input of said generator automatically to compensate frequency of said rf energy for variations in said dielectric properties.

14. A system for monitoring position of a piston within a cylinder that comprises:

a coaxial transmission line, including an outer conductor formed by said cylinder and a center conductor operatively coupled to said piston such that length of said coaxial transmission line is determined by position of said piston within said cylinder, said transmission line having a characteristic impedance, means for launching rf energy within said coaxial transmission line, said energy-launching means including an rf generator having a characteristic impedance different from said characteristic impedance of said transmission line and antenna means coupled to said generator and extending radially into said cylinder for capacitively coupling rf energy from said generator to said center conductor, said antenna means including a tapering transmission line within said cylinder for matching said characteristic impedance of said generator to that of said transmission line, and means responsive to rf energy reflected by said coaxial transmission line for indicating position of said piston within said cylinder.

15. The system set forth in claim 14 wherein said antenna means includes a portion positioned adjacent to said center conductor and an rf connector on said cylinder at a position axially and radially spaced from said portion; and wherein said transmission line extends axially and radially from said connector to said portion, and has a dimension tangential to said center conductor that varies with distance between said connector and said portion.

16. The system set forth in claim 15 wherein said dimension varies as an exponential function of said distance.

17. The system set forth in claim 15 wherein said portion comprises a pad adjacent and parallel to said center conductor, and wherein said transmission line and pad are of integral one-piece strip construction of uniform thickness.

18. A coaxial transmission line system that comprises:

a coaxial transmission line having a predetermined characteristic impedance and including a center conductor and an outer conductor, an rf generator having a characteristic impedance different from that of said transmission line, and antenna means coupled to said generator and extending radially into said transmission line for capacitively coupling rf energy from said generator to said center conductor, said antenna means including a tapering transmission line within said outer conductor for matching said characteristic impedance of said generator to that of said coaxial transmission line.

19. The system set forth in claim 18 wherein said antenna means includes a portion positioned adjacent to said center conductor and an rf connector on said cylinder at a position axially and radially spaced from said portion; and wherein said transmission line extends axially and radially from said connector to said portion, and has a dimension tangential to said center conductor that varies with distance between said connector and said portion.

20. The system set forth in claim 19 wherein said dimension varies as an exponential function of said distance 21. The system set forth in claim 19 wherein said portion comprises a pad adjacent and parallel to said center conductor, and wherein said transmission line and pad are of integral one-piece strip construction of uniform thickness.

* * * * *